(12) United States Patent
Stengel et al.

(10) Patent No.: US 7,950,915 B2
(45) Date of Patent: May 31, 2011

(54) PLASTICS INJECTION MOLDING MACHINE WITH INJECTION FORCE MEASURING DEVICE

(75) Inventors: Frank Stengel, Rossleben (DE); Holger Schmidt, Bad Frankenhausen (DE); Dietmar Scholz, Weimar (DE)

(73) Assignee: Sumitomo (Shi) Demag Plastics Machinery GmbH, Schwaig (DE)

( * ) Notice: Subject to any disclaimer, the term of this patent is extended or adjusted under 35 U.S.C. 154(b) by 29 days.

(21) Appl. No.: 12/406,429

(22) Filed: Mar. 18, 2009

(65) Prior Publication Data

US 2009/0238909 A1    Sep. 24, 2009

(30) Foreign Application Priority Data

Mar. 18, 2008 (DE) .................. 10 2008 014 782

(51) Int. Cl.
*B29C 45/77* (2006.01)
(52) U.S. Cl. .................. 425/145; 425/149; 425/150
(58) Field of Classification Search .................. 425/145, 425/149, 150
See application file for complete search history.

(56) References Cited

U.S. PATENT DOCUMENTS

| | | | |
|---|---|---|---|
| 6,386,853 B1 * | 5/2002 | Mizuno et al. ............. | 425/145 |
| 7,234,928 B2 * | 6/2007 | Emoto et al. ............... | 425/145 |
| 7,314,369 B2 * | 1/2008 | Nishino et al. ............. | 425/574 |
| 7,575,426 B2 * | 8/2009 | Sasaki et al. ............... | 425/135 |
| 2004/0130049 A1 | 7/2004 | Begemann et al. | |

FOREIGN PATENT DOCUMENTS

| | | |
|---|---|---|
| AT | 409 105 B | 5/2002 |
| DE | 101 14 006 C2 | 10/2002 |
| DE | 103 30 193 B3 | 4/2005 |
| EP | 0 230 488 A2 | 8/1987 |
| EP | 1 151 843 B1 | 2/2003 |
| EP | 1 642 697 A2 | 4/2006 |
| EP | 1 741 537 A1 | 1/2007 |

* cited by examiner

*Primary Examiner* — Tim Heitbrink
(74) *Attorney, Agent, or Firm* — Henry M. Feiereisen; Ursula B. Day

(57) ABSTRACT

A plastics injection molding machine with an injection unit has an injection unit housing as central part of the injection unit, a plasticizing cylinder connected to the injection unit housing, a screw which is supported in the plasticizing cylinder for rotation to prepare injection material and for displacement to effect the injection stroke in axial direction, drive motors coupled to and generating the rotation and axial movements of the screw and supported on the injection unit housing via a motor flange, and an injection force measuring device for determining the injection force applied by the screw when executing its injection stroke, wherein the injection force measuring device includes at least one tensile force sensor which is integrated in the injection unit housing in such a manner that the reaction force of the injection force, as generated by the injection force and introduced via the motors and the motor flange into the injection unit housing, is detectable.

7 Claims, 3 Drawing Sheets

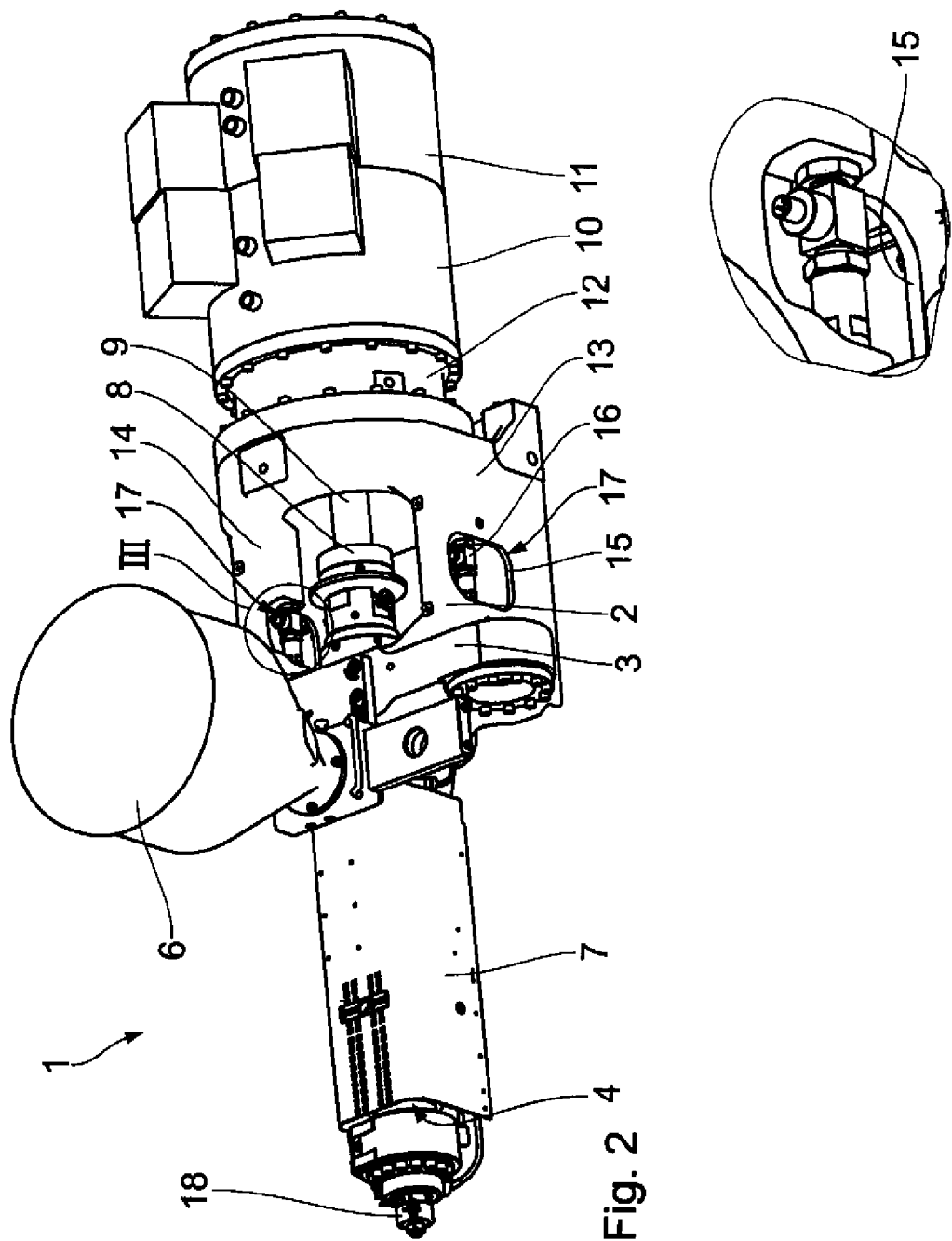

US 7,950,915 B2

PLASTICS INJECTION MOLDING MACHINE WITH INJECTION FORCE MEASURING DEVICE

FIELD OF THE INVENTION

The Invention relates to a plastics injection molding machine with an injection unit, comprising an injection unit housing as central part of the injection unit, a plasticizing cylinder connected to the injection unit housing, a screw which is supported in the plasticizing cylinder for rotation to prepare injection material and for displacement to effect the injection stroke in axial direction, drive motors coupled to and generating the rotation and axial movements of the screw and supported on the injection unit housing via a motor flange, and an injection force measuring device for determining the injection force applied by the screw when executing its injection stroke.

BACKGROUND OF THE INVENTION

Such an injection molding machine with an injection unit is known, for example, from DE 101 14 006 C2. This injection unit includes as central "backbone" a so-called injection unit housing which normally has a solid, box or frame-like base structure. Attached to this injection unit housing is the plasticizing cylinder in which a screw is supported for rotation to prepare the plastic injection compound and for displacement to execute its injection stroke in axial direction. The screw is coupled to drive motors to generate the rotation and axial movements. These drive motors are supported on the injection unit housing via a motor flange.

In order to monitor the process during plastics injection molding, it is imperative to have knowledge about the injection force generated by the screw during its injection stroke. Injection force measuring devices are basically known in the state of the art.

The injection molding machine according to the aforementioned DE 101 14 006 C2 includes for this purpose strain sensors in the form of strain gauges or piezoelectric elements which are arranged in an axial circumferential U-shaped depression to allow determination of a deformation caused by an expansion of the motor flange as a consequence of a reaction force resulting from the injection force of the screw. This reaction force is transmitted via the screw onto the motor shaft which drives the screw and is supported axially in the motor casing. The reaction force is transmitted via this support onto the motor casing and thus onto the flange.

The conventional injection force measuring device has various shortcomings. The motor flange on which the strain sensors are attached is a component within the injection unit and exposed to dynamic interferences, such as torsional and vertical vibrations, in particular during the plasticizing and injection operations. These are directly transferred onto the motor flange and thus falsify the measured signal of the strain sensors.

In addition, the attachment zone of the strain sensors undergoes great temperature fluctuations as a result of its immediate proximity to significant heat sources, such as the drive motors themselves and the motor bearings.

Finally, the conventional configuration of the injection force measuring device does not allow the use of commercially available, industrial standard tensile force sensors. In contrast thereto, the strain gauges to be used are more difficult to use and increase the risk of error, especially when incorrectly attached.

SUMMARY OF THE INVENTION

On the basis of the described problem of the prior art, the invention is based on the object to provide a plastics injection molding machine with an injection force measuring device which is simple in structure and capable of measuring in a substantially trouble-free manner.

This object is attained by the invention, according to which the injection force measuring device includes at least one tensile force sensor which is integrated in the injection unit housing in such a manner that the reaction force of the injection force, as generated by the injection force and introduced via the motors and the motor flange into the injection unit housing, is detectable. The measuring zone is thus shifted into a region of the housing exposed to tensile stress, i.e. substantially remote to the motor flange used in the prior art. Interferences, such as torsional moments and temperature fluctuations emanating from the motors, are deflected via the housing construction into the machine bed and thus have no or at least significant less impact on the tensile force sensor.

This effect is even further improved in accordance with the invention by the preferred disposition of the tensile force sensor in the area of the neutral fiber of the wall of the injection force measuring device. Forces acting in the area of the neutral fiber have least impact on the wall of the housing.

A preferred embodiment of the invention provides a constructively especially simple manner of integration of the tensile force sensor in the injection housing. Preferably, the recess for receiving the tensile force sensor is hereby constructed as an opening of the wall of the injection unit housing. As a result, the installation site becomes well accessible also with respect to an exchange of the sensor.

The optional use of industrial standard tensile force sensors represents a cost-efficient alternative, on the one hand, which is accompanied by a high measurement accuracy and reliability of the injection force determination, on the other hand.

The use of two tensile force sensors, integrated in the injection unit housing in opposite relationship with respect to the central injection axis further improves the measuring accuracy.

According to a further preferred embodiment of the invention it is possible to use one and the same sensors with same measuring range for different injection forces to be ascertained, i.e. different machine classes.

Further features, details and advantages of the invention become evident from the following description which describes in greater detail an exemplary embodiment with reference to the attached drawings.

DETAILED DESCRIPTION OF A PREFERRED EMBODIMENT

The drawings show an injection unit of a plastics injection molding machine, generally designated with 1. The central part of this injection unit 1 is an injection unit housing 2 which involves a frame or box-like, solid casting. Attached to a traverse 3 of the housing 2 are nozzle assembly drives which are not shown in greater detail and provided to move the entire injection unit 1 towards the injection nozzle of the injection mold.

Figure 1:
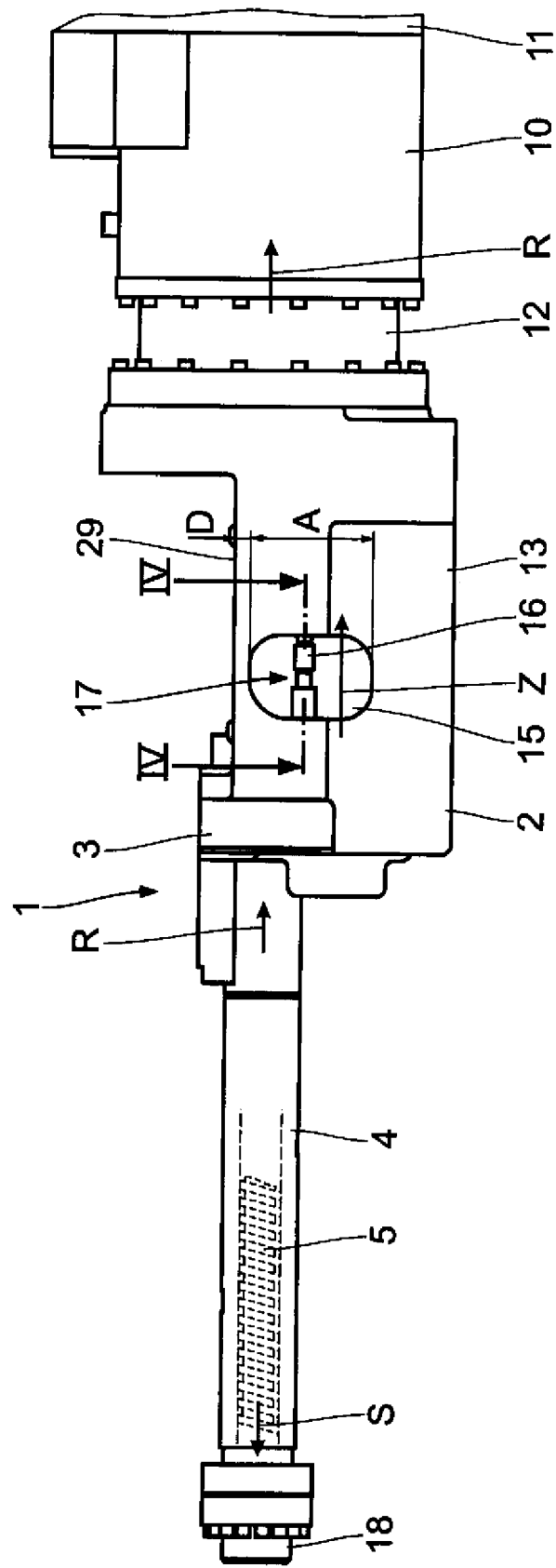
FIG. 1 a schematic partial view of an injection unit of a plastics injection molding machine, FIG. 2 a perspective view of the injection unit of FIG. 1, FIG. 3 an enlarged detailed view of the area III of FIG. 2, FIG. 4 a horizontal cutaway view taken along the section line IV-IV in FIG. 1, and FIG. 5 a vertical section taken along the section line V-V in FIG. 4.

Arranged in the area of this traverse 3 is a plasticizing cylinder 4 in which a screw 5, indicated in FIG. 1 by a dashed line, is supported for rotation to prepare the plastic injection material and for displacement to implement the injection stroke in axial direction. Unlike FIG. 1, FIG. 2 shows further the feed hopper 6 for the plastic injection material to be prepared and a temperature-controlling unit 7 about the plasticizing cylinder 4.

The rearward end 8 of the screw 5 is extended by a shaft 9 toward the two drive motors 10, 11 which are positioned coaxially behind one another and produce the rotation and axial movements of the screw 5 in a known manner. Both drive motors 10, 11 are supported by a motor flange 12 on the side of the housing in opposition to the traverse 3. Traverse 3 and motor flange 12 are connected by the two sidewalls 13, 14 of the housing 2 which extend in parallel relationship to the axial direction of the screw 5.

As clearly seen from FIGS. 3 to 5, both these sidewalls 13, 14 are each formed with a substantially rectangular recess 15 in the form of a through opening in the direction of the thickness for respective installation of a commercially available, industrial standard tensile force sensor 16 in a manner described in greater detail hereinafter. These tensile force sensors 16 form the core of the injection force measuring device of the injection unit, generally designated by 17.

Before describing its constructive configuration in detail, the principle underlying the measuring device 17 should be explained. As the drive motors 10, 11 are suitably activated, the screw 5 is moved in the direction of the injection nozzle 18 on the front end of the plasticizing cylinder 4 for executing the injection stroke. As a result, the injection force, indicated in FIG. 1 by arrow S, is applied onto the prepared plastic injection material in the plasticizing cylinder 4. The corresponding reaction force R which is transmitted via the shaft 9 onto the drive motors 10, 11, propagates further towards the motor flange 12 via the respective support of the shaft 9 in the motors 10, 11. As a result, the reaction force R is then introduced in the form of a tensile force Z into the two sidewalls 13, 14 of the housing 2, with the tensile force Z to be determined with the assistance of the injection force measuring device 17. This tensile force Z causes an expansion of the material in the area of the sidewalls 13, 14 and thus of the recesses 15, which expansion can be detected by the two tensile force sensors 16.

Figure 5:
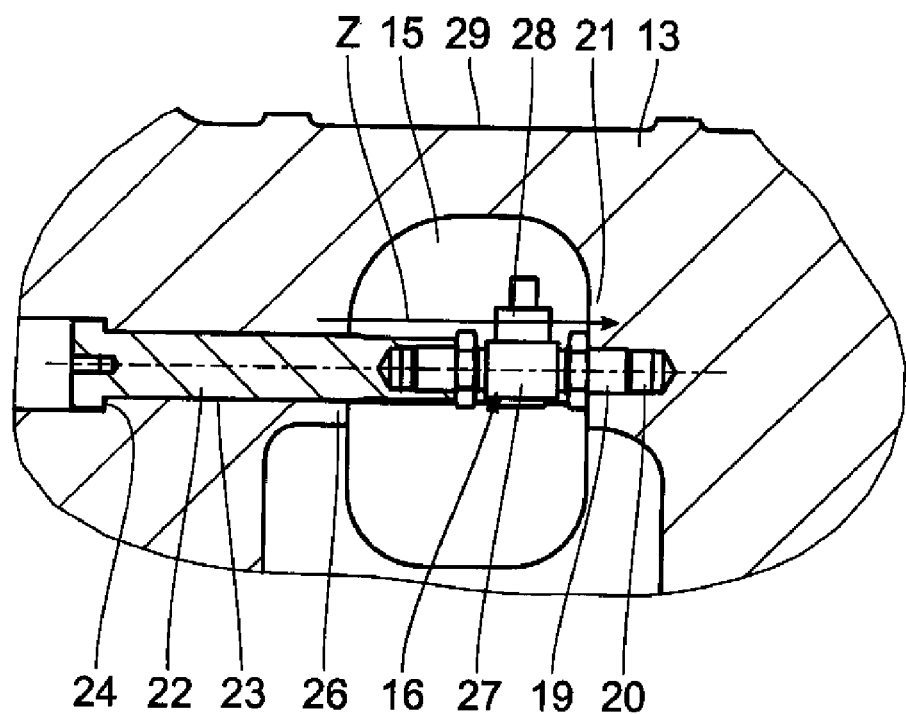

As can be clearly seen from FIG. 5, the tensile force sensors 16 are each secured in relation to the recess 15 on the one side by a locking bolt 19 in a threaded bore 20 in the marginal zone 21 of the housing 2 extending transversely to the tensile force Z. Provided in coaxial aligned relationship to the locking bolt is a socket pin 22 which can be inserted up to a stop 24 in a receiving bore 23 in the sidewall 13 and 14, respectively. The socket pin has a free end which faces the tensile force sensor 16 and is also provided with a coaxial threaded bore 20 for threaded engagement of a locking bolt 25 of the tensile force sensor 16 which locking bolt 25 is directed in opposition to the locking bolt 19. As a result, the locking bolt 25 is placed in forced engagement with the marginal zones 21, 26 of the recess 15, the measuring part 27 of the tensile force sensor 16 expands as the respective sidewall 13 or 14 expands, the respective electric signal can be tapped and further transmitted via a contact sleeve 28 and an attached (not shown) signal cable to a respective evaluation unit.

Figure 4:
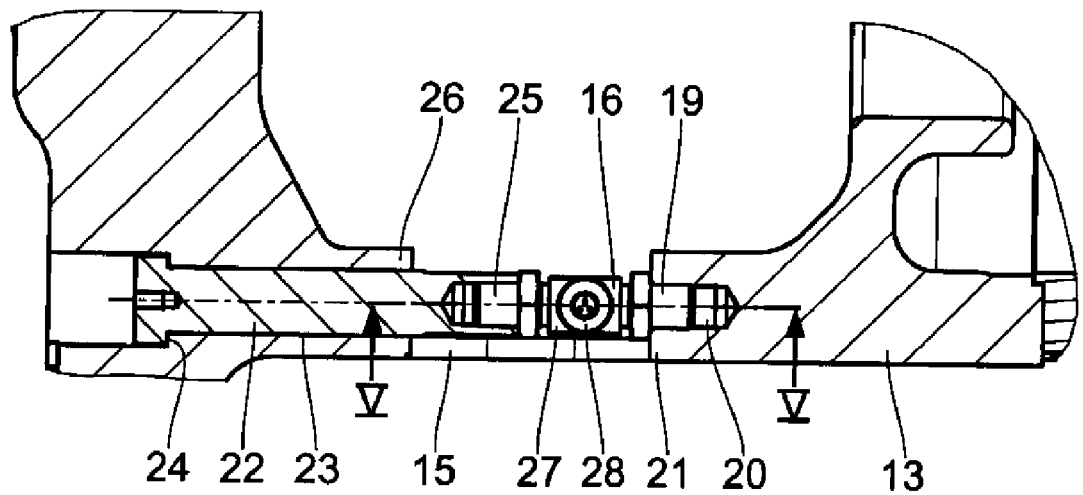

As can be clearly seen from FIG. 4, the tensile force sensor 16 with the respective recess 15 is arranged in the neutral fiber of the sidewall 13 and 14, respectively, of the injection unit housing 2. As a result, the injection force measuring device 17 is substantially free from interfering influences which act on the sidewalls 13, 14 as a result of torsional forces, moments, or vibrations.

Finally, FIG. 1 also shows the dimension A of the recess 15 in axial circumferential direction and the distance D of the recess 15 from the edge 29 of the sidewalls 13, 14 extending in axial circumferential direction, as general indication of the measure for the arrangement of the recess 15 in axial circumferential direction. Both these variables, namely dimension A and distance D can be varied depending on the type of machine such that differences in the injection force S are accompanied by a constant order of magnitude of the expansion of the recess 15 in the area of the tensile force sensor 16. Thus, one and the same type of tensile force sensor 16 can be used for greatly varying machine classes with different orders of magnitude of the injection force so that parts diversification and storage can be kept small for the production and maintenance of such injection molding machines.

What is claimed is:

1. A plastics injection molding machine with an injection unit (1), comprising
    an injection unit housing (2),
    a plasticizing cylinder (4) connected to the injection unit housing (2),
    a screw (5) which is supported in the plasticizing cylinder (4) for rotation to prepare injection material and for displacement to effect an injection stroke in axial direction,
    drive motors (10, 11) coupled to and generating a rotation and axial movements of the screw (5) and supported on the injection unit housing (2) via a motor flange (12), and
    an injection force measuring device (17) for determining an injection force (S) applied by the screw (5) when executing its injection stroke,
    wherein the injection force measuring device (17) includes at least one tensile force sensor (16) which is integrated in the injection unit housing (2) in such a manner that a reaction force (R) of the injection force, as generated by the injection force (S) and introduced via the motors (10, 11) and the motor flange (12) into the injection unit housing (2), is detectable, and
    wherein the at least one tensile force sensor (16) is arranged in a recess (15) of the injection unit housing (2) and placed in relation to the recess (15) in force-transmission with marginal zones (21, 26) of the injection unit housing (2), which extend transversely to the reaction force (R).

2. A plastics injection molding machine according to claim 1, wherein the at least one tensile force sensor (16) is arranged in an area of a neutral fiber of a wall (13, 14) of the injection unit housing (2).

3. A plastics injection molding machine according to claim 1, wherein the at least one recess (15) is a through opening in the wall (13, 14) of the injection unit housing (2).

4. A plastics injection molding machine according to claim 1, wherein the at least one tensile force sensor (16) is an industrial standard tensile force sensor.

5. A plastics injection molding machine according to claim 1, wherein the injection force measuring device (17) includes two tensile force sensors (16) which are integrated in the injection unit housing (2) in opposing relationship with respect to a central injection axis.

6. A plastics injection molding machine according to claim 1, wherein the recess (15) is arranged in the injection unit housing (2) and has a dimension in a circumferential direction such as to produce an axial elongation in the injection force measuring device (17) over an injection force measuring range that is independent of a machine type of the plastics injection molding machine.

7. A plastics injection molding machine according to claim 6, wherein the recess has an arrangement in the injection unit housing (2) such as to produce the axial elongation in the injection force measuring device (17).

* * * * *